US008516944B2

(12) United States Patent
Desbois-Renaudin

(10) Patent No.: US 8,516,944 B2
(45) Date of Patent: Aug. 27, 2013

(54) VALVE ARRANGEMENT HAVING INDIVIDUAL PRESSURE SCALE AND LOAD-LOWERING VALVE

(75) Inventor: Matthieu Desbois-Renaudin, Villard de Lans (FR)

(73) Assignee: Robert Bosch GmbH, Stuttgart (DE)

( * ) Notice: Subject to any disclaimer, the term of this patent is extended or adjusted under 35 U.S.C. 154(b) by 763 days.

(21) Appl. No.: 12/598,083

(22) PCT Filed: Mar. 14, 2008

(86) PCT No.: PCT/EP2008/053102

§ 371 (c)(1),
(2), (4) Date: Feb. 11, 2010

(87) PCT Pub. No.: WO2008/135303

PCT Pub. Date: Nov. 13, 2008

(65) Prior Publication Data

US 2010/0139476 A1 Jun. 10, 2010

(30) Foreign Application Priority Data

May 2, 2007 (DE) ......................... 10 2007 020 558

(51) Int. Cl.
*F15B 11/04* (2006.01)
*F16K 31/12* (2006.01)

(52) U.S. Cl.
USPC .................................. 91/433; 91/446; 91/466

(58) Field of Classification Search
USPC .................................... 91/420, 433, 446, 466
See application file for complete search history.

(56) References Cited

U.S. PATENT DOCUMENTS

| | | | | |
|---|---|---|---|---|
| 5,307,631 | A * | 5/1994 | Tatsumi et al. | 91/459 |
| 6,158,462 | A * | 12/2000 | Kashiwagi et al. | 91/446 |
| 6,701,823 | B2 * | 3/2004 | Weber et al. | 91/466 |
| 6,854,270 | B2 * | 2/2005 | Zenker et al. | 91/446 |
| 6,868,672 | B2 * | 3/2005 | Luo | 91/466 |
| 7,581,487 | B2 * | 9/2009 | Bulgarelli et al. | 91/446 |

FOREIGN PATENT DOCUMENTS

| | | | |
|---|---|---|---|
| DE | 4016360 | A * | 11/1991 |
| DE | 197 15 020 | | 10/1998 |
| EP | 0 765 970 | | 4/1997 |
| JP | 58 121303 | | 7/1983 |

OTHER PUBLICATIONS

"High Pressure Load-Sensing Control Block in Sandwich Plate Design" Type M4-12, RD 64276, Bosch Rexroth AG, Lohr Am Main, Jul. 2006 (With Partial English Translation).
"Control Block With Flow Distribution Independent of the Pressure and Available Flow" Type SX 14, RD 64125, Bosch Rexroth AG, Lohr Am Main, Jul. 2005 (With Partial English Translation).
Data Sheet Counterbalance, Standard Poppet Type, Differential Area, Special Cavity, VBSO-SEC-42, 04.52.12-X-99-Z, Sep. 2005.

* cited by examiner

*Primary Examiner* — Thomas E Lazo
(74) *Attorney, Agent, or Firm* — Michael J. Striker

(57) ABSTRACT

The invention discloses a valve arrangement for supplying pressure medium to a hydraulic load (2) having a directional valve (8), which has an inflow measuring diaphragm (10, 12) and a directional part (14, 16) flowing in the flow direction. The directional valve is associated with an individual pressure scale (18). In a return from the load, a load-lowering valve (44, 46) is provided, to which a pilot pressure is applied in the opening direction. According to the invention, said pilot pressure is tapped in channel between the pressure scale and the directional part.

10 Claims, 3 Drawing Sheets

VALVE ARRANGEMENT HAVING INDIVIDUAL PRESSURE SCALE AND LOAD-LOWERING VALVE

The present invention relates to a valve arrangement for supplying pressure medium to a hydraulic consumer, according to the preamble of claim 1.

Valve arrangements of this type have a plate-type design, for example, and are used in mobile control blocks to control hydraulic consumers in mobile working devices, e.g., compact construction machines such as tractor backhoe loaders, mini-excavators and compact excavators, and telehandlers. One requirement on the hydraulic system of mobile working devices of this type is that the lowering of a large negative or pulling load take place in a controlled manner. Counterbalance or load-lowering valves are often used on the drain side for this purpose. The counterbalance or load-lowering valves generate a preload in the return that acts against the main drive pressure, and so the load is positive once more for the entire system and therefore remains controllable.

A load-lowering valve of this type, as described, e.g., in data sheet VPSO-SEC-42; 04.52.12-X-99-Z published by the company Oil Control, a subsidiary of the applicant, is basically a shutoff valve that may be released via the pressure in the supply, and that enables a pushing load to be lowered in a controlled manner. The known load-lowering valve includes a non-return valve that allows pressure medium to be supplied to the consumer, and that is furthermore designed as a poppet valve, thereby enabling the load to be supported in a zero-leakage manner. A further advantage of these known load-lowering valves is that they act as secondary pressure relief valves, thereby preventing the pressure in the return from exceeding a maximum value set at the load-lowering valve.

Load-lowering valves of this type may be used, e.g., in LS control blocks, of the type described in DE 197 15 020 A1 or the data sheet RD 64 276/06.06, or in LUDV control blocks as described in data sheet RD 64 125/07.05 from Bosch Rexroth AG. In the case of the latter LUDV control blocks, the valve arrangement ensures that the pressure medium flow that is independent of the load pressure and the available flow is distributed to the various consumers in the mobile working device. A directional valve element including two consumer ports, which may be connected via a directional valve to an LS pump or a tank, is assigned to each consumer. The directional valve is designed to be proportional, and it includes a velocity part for adjusting the pressure medium flow, and a directional control part for adjusting the direction of flow. A pressure compensator which forms the changeable inlet metering orifice is provided downstream of the velocity part; the pressure compensator is acted upon in the closing direction by the maximum load pressure of all consumers, and in the opening direction by the pressure downstream of the inlet metering orifice, and so the flow is distributed to the various consumers in a manner that is independent of the load pressure. To prevent a pulling load from being lowered in an uncontrolled manner, one of the above-described load-lowering valves may be installed in the return from the consumer. This load-lowering valve is controlled by the pressure in the supply to the consumer in order to build up the aforementioned back-pressure. To protect both directions of motion of the consumer against a negative load, a load-lowering valve is assigned to each of the consumer ports, which may then be controlled open practically via cross over by the pressure present at the other consumer port. However, in the case of LUDV control blocks of this type in particular, extremely complex production engineering measures are required to tap this pilot pressure—which is required to open the load-lowering valve located in the particular return—from the supply at the other consumer port.

Therefore, the object of the present invention is to create a simply designed valve arrangement which may be used to prevent the consumer from being lowered in an uncontrolled manner.

This object is attained via a valve arrangement having the features of claim 1.

According to the present invention, the valve arrangement includes a directional valve which is accommodated in a housing and includes an adjustable inlet metering orifice and a directional control part for adjusting the direction of flow. A pressure compensator is assigned to the adjustable inlet metering orifice, and a load-lowering valve is located in a return from the consumer; the load-lowering valve is acted upon in the opening direction by a pilot pressure that is dependent on the pressure present at a return-side consumer port. A non-return valve that is open in the direction toward the consumer is connected in parallel to the load-lowering valve. According to the present invention, the pilot pressure is tapped in a channel between the pressure compensator and the directional control part.

Therefore, according to the present invention, a channel that is present anyway is utilized, and it is merely bored into, thereby eliminating the need for complex channel guidance, e.g., around the pressure compensator toward the return-side consumer port. It has been shown that tapping the pilot pressure in the region between the pressure compensator and the directional control part has no functional disadvantages compared to the conventional solution in which the pilot pressure is tapped downstream of the directional control part.

The valve arrangement according to the present invention is preferably designed as an LUDV valve arrangement including the pressure compensator connected downstream of the inlet metering orifice; the pressure compensator is acted upon by the highest load pressure of all consumers in the direction of reducing the opening cross section, and by the pressure downstream of the inlet metering orifice in the direction of increasing the opening cross section.

In LUDV systems of this type, a pressure compensator outlet is typically connected via a curved channel to the intermediate chamber of a supply-side directional control part and of a return-side directional control part of the directional valve. According to the present invention, this curved channel is used to tap the pilot pressure.

According to a preferred embodiment of the present invention, a load-lowering valve is assigned to each consumer port, and the same pilot pressure is applied to each load-lowering valve. This is a main difference from conventional solutions, in which the pilot pressure is tapped via cross over at the other consumer port.

The design of the valve arrangement is particularly compact when this pilot pressure acts on the end face of a pilot surface of the load-lowering valve, and so merely one short channel need be provided in order to connect the pressure chamber bounded by this pilot surface to the curved channel.

The compactness may be improved further by situating the two load-lowering valves relative to one another in the housing such that they approximately form a “V”, in which case the pressure compensator is then preferably located approximately in the symmetry axis between the two load-lowering valves.

According to the present invention, it is preferable for the two working ports of the directional valve which are connected to the consumer ports of the valve arrangement to be connected to a tank port when the directional valve is in its home position.

The design of the load-lowering valve is particularly compact when the non-return valve and the load-lowering valve are located on a common axis.

The valve arrangement is preferably designed as a valve disk or a directional valve element of an LUDV mobile control block.

Other advantageous developments of the present invention are the subject matter of further dependent claims.

A preferred embodiment of the present invention is explained below in greater detail with reference to schematic drawings.

Figure 1:
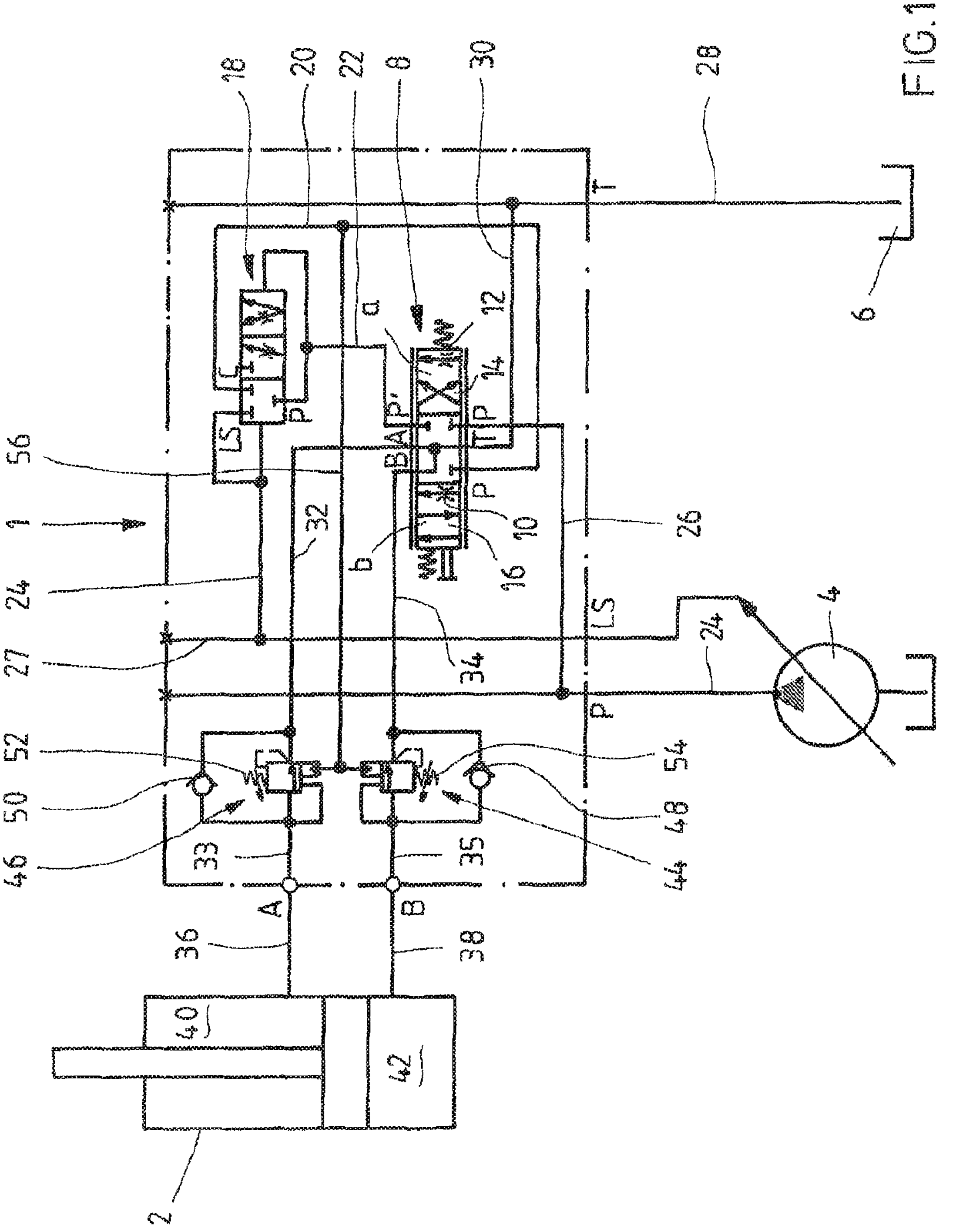
FIG. 1 shows a schematic diagram of a directional valve element according to the present invention.

FIG. 1 shows a directional valve element 1 of a mobile control block for controlling a mobile working device. A mobile control block of this type has a plate-type design and typically includes an inlet element, a large number of directional valve elements, and an end element. Via each directional valve element 1, a consumer 2 may be connected to a pump 4 or a tank 6. In the embodiment shown, the control block is designed as an LUDV control block, in the case of which the flow is distributed to the individual consumers of the working device independently of the load pressure and the pressure medium flow available via pump 4. The basic design of directional valve 1 in FIG. 1 corresponds to a conventional LUDV directional control block, model SX, as described in aforementioned data sheet RD 64 125, and so only those designs that are required to understand the application will be described below.

Disk-shaped directional valve element 1 includes two consumer ports A, B, a pressure port P, a tank port T, and an LS (load sensing) port LS. Via the LS port, the highest load pressure of all consumers 2 is tapped and supplied to a pump regulator (not depicted) which, in the present case, is pump 4 designed as a variable-displacement pump. Via this pump regulator, the pump pressure is adjusted such that it is always above this highest load pressure by a predetermined differential pressure. Instead of the variable-displacement pump shown, it is also possible to use a constant pump that includes a bypass pressure relief valve.

Directional valve 1 is composed mainly of a, e.g., manually operated, proportional directional valve 8 that includes a pressure port P, a tank port T, a further supply port P", two working ports A, B, and a pressure compensator port P'. Directional valve 8 forms inlet metering orifices 10, 12—each of which is assigned to an adjusting device—for adjusting the pressure medium flow, and directional control parts 14, 16 for adjusting the direction of flow through directional valve 1. In the spring pre-loaded home position of directional valve 8, working ports A, B are connected to tank T.

When the directional valve element is displaced in one of the directions labeled (a), port T is connected to working port B, pressure compensator port P' is connected to supply port P, and working port A is connected to port P". When the directional valve element is displaced in the opposite direction (b), pressure port P is connected to pressure compensator port P', further supply port P" is connected to working port B, and working port A is connected to tank port T. An individual pressure compensator 18 is provided downstream of inlet metering orifices 10, 12, and, together with inlet metering orifices 10, 12, forms a flow regulator via which the pressure medium flow to the consumer may be held constant. Pressure compensator 18 includes a supply port P, an LS port, and a drain port C which is connected via a curved channel 20 to further supply port P" of directional valve element 1. Supply port P of pressure compensator 18 is connected via a pressure compensator channel 22 to pressure compensator port P' of directional valve 8. The pressure in this pressure compensator channel 22 also acts on pressure compensator 18, in the opening direction. The LS port of pressure compensator 18 leads via an LS port channel 24 into an LS channel 27 in which the highest load pressure exists, this highest load pressure being tapped via a cascade of shuttle valves. LS channel 27 leads into LS port of directional valve element 1. The pressure in LS channel 27 acts on pressure compensator 18 in the closing direction.

In the home position of pressure compensator 18 shown, which may be attained using a weak spring, port P, C, and LS of pressure compensator 18 are shut off. When pressure builds up in pressure compensator channel 22, pressure compensator 18 is displaced in the opening direction, thereby controlling-open an opening cross section between supply port P and pressure compensator port C. Once pressure compensator 18 has been controlled entirely open, supply port P is connected to the LS port of pressure compensator 18, and so the pressure in pressure compensator channel 22 is signaled to LS channel 27.

Pressure port P of directional valve element 1 is connected via a pump line 24 to the pressure port of pump 4. The pressure medium flow provided by pump 4 is directed within directional valve 1 via a supply channel 26 to supply port P of directional valve 8. Tank port T of directional valve element 1 is connected via a tank line 28 to tank 6, and it has a pressure medium connection to directional valve 8 via a drain channel 30.

Working ports A, B are connected via working channels, which are referred to below as supply channel 34 and return channel 32, and via consumer channels 33, 35 to consumer ports A and B of directional valve element 1. In turn, they are connected via working lines 36, 38 to annular space 40 and/or a lower cylinder chamber 42 of consumer 2 which is designed as a hydrocylinder.

One load-lowering valve 44, 46 each is located in supply channel 32 and in return channel 34, to each of which a non-return valve 48, 50, respectively, is assigned; non-return valves 48, 50 open in the direction toward particular consumer port A, B. As described in greater detail below, non-return valves 48, 50 are integrated in load-lowering valves 44 and 46, respectively. Load-lowering valves 44, 46 support the load in a zero-leakage manner. Furthermore, they act as secondary pressure relief valves and prevent a negative load from being lowered in an uncontrolled manner. Furthermore, if a load should drop in this manner, cavitations are prevented in the channels which lead toward the expanding pressure chamber of consumer 2.

The basic design of a load-lowering valve of this type is described in aforementioned data sheet 04.52.12-X-99-Z published by the company Oil Control. Each load-lowering valve 44 is acted upon via an adjustable closing spring 52 or 54 in the closing direction and in the opening direction via the load pressure in the region of consumer channels 33, 35, and via a pilot pressure which is tapped from curved channel 20 via a pilot channel 56. As shown in FIG. 1, this pilot pressure acts simultaneously on both load-lowering valves 44, 46 in the opening direction. In the embodiment shown, load-lowering valves 44, 46 are also acted upon in the closing direction by the pressure on the directional valve side in channels 32 and 34. However, variants of these load-lowering valves are provided, in which this "back-pressure" also acts in the opening direction and is therefore compensated for. Reference is made in this regard to the related literature on the "counterbalance valves" from Oil Control.

Figure 2:
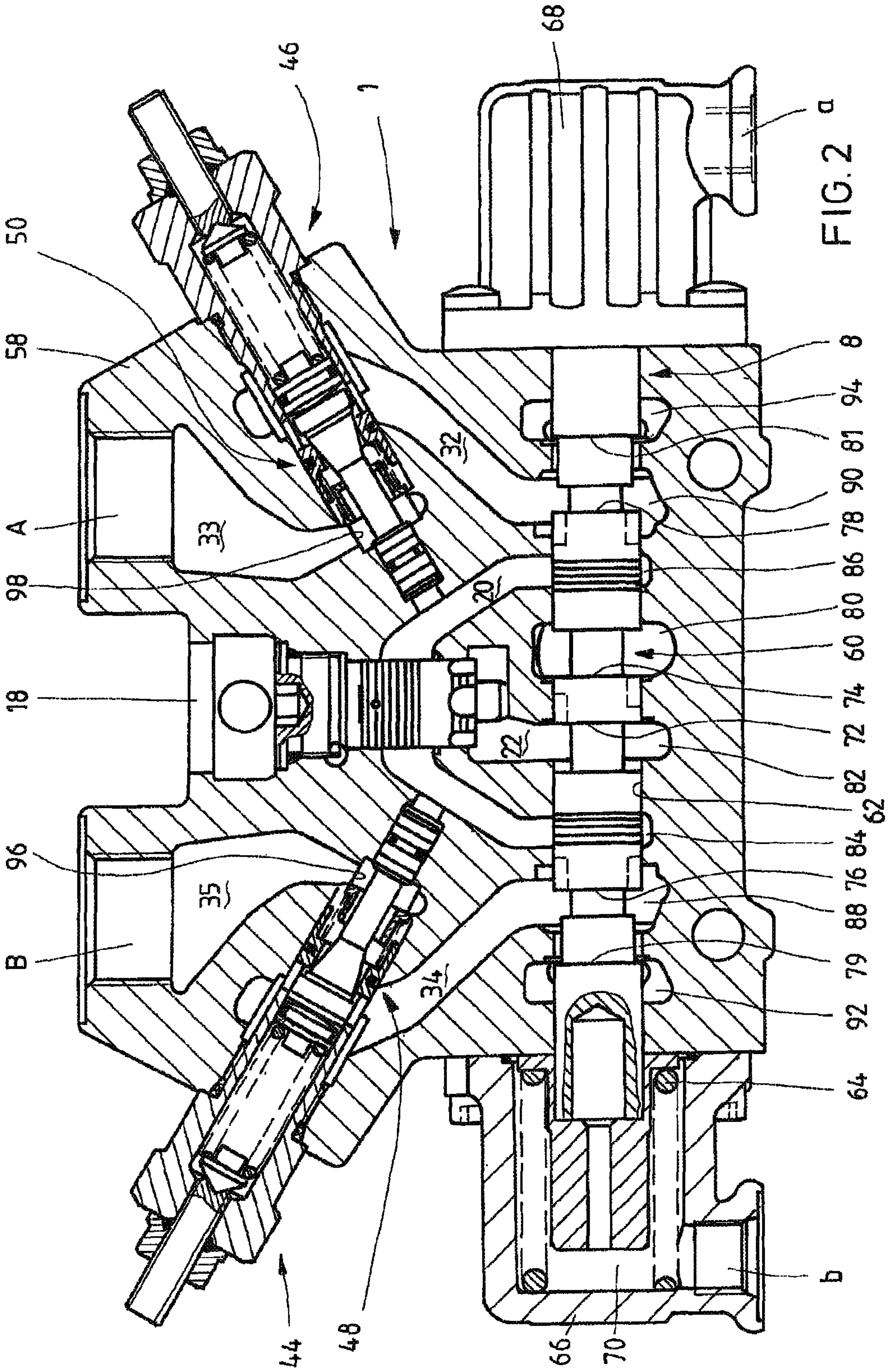
FIG. 2 shows a cross section of a directional valve element designed according to this schematic diagram.

FIG. 2 shows a cross sectional view of a directional valve element 1, the design of which is based on the above-described circuit concept, with the sole difference being that the directional valve element shown in FIG. 2 is hydraulically actuated, while the directional valve element shown in FIG. 1 is manually actuated.

As shown in FIG. 2, directional valve 1 includes a disk-shaped housing 58 in which consumer ports A, B are formed. Housing 58 accommodates directional valve 8, pressure compensator 18, and the two load-lowering valves 44, 46.

Directional valve 8 includes a directional valve spool 60 which is displaceably guided in a valve bore 62 of housing 58. A centering spring system 64 that is accommodated in spring housings 66, 68 which are flange-mounted on the sides acts on end sections of valve spool 60 which extend out of both sides of housing 58. In the embodiment shown, particular enclosed spring chamber 70 may be acted upon via a control connection x, y via a control pressure to displace valve spool 60. In many cases, however, this displacement is carried out manually using a control lever, and so the spring chambers are ventilated accordingly.

Valve spool 60 is provided with a large number of annular grooves in a manner known per se, and so two metering orifice control edges 72, 74 are formed on a central control collar, and a directional control edge 76, 78 is formed on each of the two control collars located on either side thereof. Tank control edges 79 and 81 are provided on each of the two end collars of valve spool 60.

Valve bore 62 expands in the central region to form a supply chamber 80 which is connected to supply channel 26. To the left thereof, as shown in the illustration in FIG. 2, a pressure compensator chamber 82 is provided which is connected via metering orifice control edges 72, 74 to supply chamber 80, depending on the direction of displacement of valve spool 60. Metering orifice chamber 82 is connected via above-described pressure compensator channel 22 to the axial inlet of pressure compensator 18 located at the bottom in FIG. 2.

Valve bore 62 includes an intermediate chamber 84, 86 on either side of the two chambers 80, 82; intermediate chambers 84, 86 are connected via curved channel 20 described in FIG. 1 to the radial outlet of pressure compensator 18, and curved channel 20 encloses the outer circumference of pressure compensator 18 in an annular manner, and so both legs of curved channel 20 are connected to one another.

One working chamber 88 and 90, respectively, and one tank chamber 92 and 94, respectively, are provided on either side of intermediate chambers 84, 86. Working chambers 88, 90 are connected via supply channel 34, return channel 32, and consumer channels 35, 33 to consumer ports B and A, respectively; load-lowering valves 44, 46 are installed in the pressure medium flow paths to ports A, B.

Both of the two outwardly located tank chambers 92, 94 are connected to drain channel 30, which is not shown in FIG. 2, via which the pressure medium may be returned to tank 6.

In the home position of valve spool 60 shown in FIGS. 1 and 2, the pressure medium connection between chambers 80, 82 and 86, 90 and 84, 88 is shut off. The pressure medium connection of working chambers 88, 90 to adjacent tank chambers 92, 94 is controlled-open by particular tank control edge 79, 81, thereby relieving channels 32, 34 toward the tank.

In the illustration shown in FIG. 2, the axis of directional valve 8 extends approximately in the horizontal plane, while the pressure compensator axis is situated at a right angle thereto in the vertical plane. The valve axes of load-lowering valves 44, 46 are slanted relative thereto, forming a "V", thereby resulting in an extremely compact design. The outer surfaces of housing 58 are tapered in a manner that corresponds to the slant of the load-lowering valve axes. According to the illustration in FIG. 2, load-lowering valves 44, 46 have a cartridge-type design, and each one is inserted in a stepped load-lowering valve bore 96, 98, each of the radially offset end sections of which leads into a leg of curved channel 20. The basic design of load-lowering valves 44, 46 is explained, as an example, with reference to the enlarged depiction of load-lowering valve 46 shown in FIG. 3, although only essential components will be described and, for the rest, reference is made to aforementioned data sheet 04.52.12-X-99-Z for valve VBSO-SEC-42.

Load-lowering valve 46 includes a housing cartridge 100 which is screwed into load-lowering valve bore 98; housing cartridge 100 accommodates only a portion of the movable components since it is guided mainly directly in load-lowering valve bore 98. Every load-lowering valve includes a closing body 102 which is preloaded against a valve seat 106 using a cone. This preload is provided by a closing spring 52 which is accommodated in housing cartridge 100, and which engages via an axially displaceable spring plate 108 on rear end wall of cone 104. Spring plate 108 is guided in housing cartridge 100 in a sealing manner. Closing spring 52 bears against an adjusting screw 110 which is displaceably accommodated in housing cartridge 100, and so the preload of closing spring 52 and, therefore, the maximum pressure preset by load-lowering valve 46 is changeable. Adjusting screw 110 is fixed in position using a counternut 111. As shown in the illustration in FIG. 3, housing cartridge 100 extends beyond return channel 32 and into load-lowering valve bore 98. In the region of return channel 32, load-lowering valve bore 98 expands to become an annular chamber 112. It is connected via a radial jacket bore 114 in housing cartridge 100 to a spring chamber 116 which accommodates closing spring 52, and so the pressure in working chamber 90 is present in spring chamber 116.

Likewise, a large number of recesses 118 is provided in the jacket of housing cartridge 100 in the region of annular chamber 112, via which the region of the space inside housing cartridge, which is guided between valve seat 106 and spring plate 108 in a sealing manner, is connected to return channel 32.

A seat sleeve 120, which forms valve seat 106, bears against the end section of housing cartridge 100 which includes recesses 118. This is guided in a sealing manner along a section of load-lowering valve bore 98 which abuts housing cartridge 100, and it is preloaded via a weak spring 122 against the adjacent end wall of housing cartridge 100. Spring 122 bears against a support bush 124 which itself bears against a radial shoulder 126 of load-lowering valve bore 98. Non-return valve 48 is formed by seat sleeve 120 and support bush 124; via non-return valve 48, the pressure medium may be directed from return channel 32 around load-lowering valve 46 to working port A.

Figure 3:
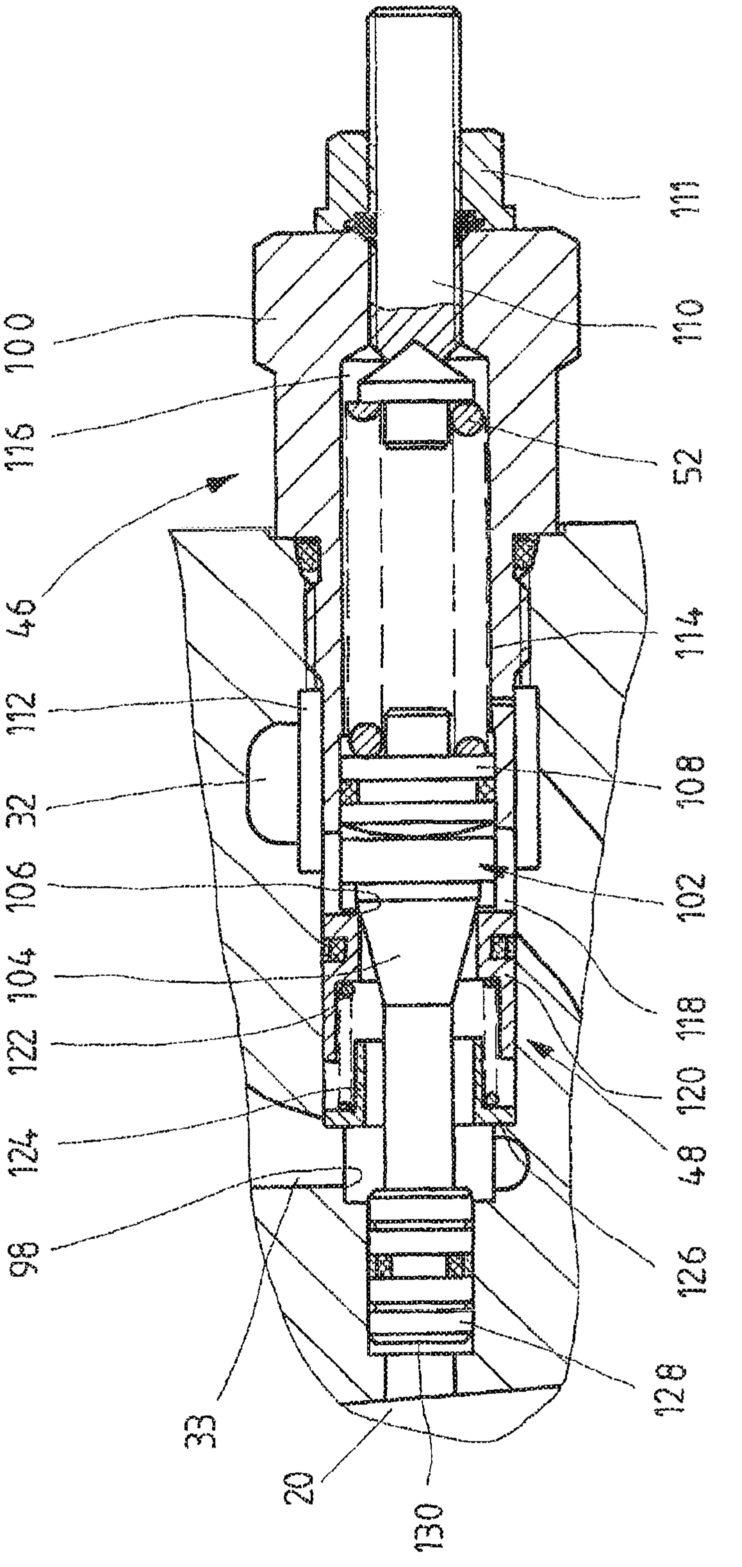
FIG. 3 shows an enlarged view of a load-lowering valve of the directional valve element in FIG. 2.

A projection of closing body 102 which abuts cone 104 on the left as shown in FIG. 3 carries a pilot collar 128 on its end section, which is guided in a sealing manner in the offset end section—shown at the left in FIG. 3—of load-lowering valve bore 98, and so an end-face pilot surface 130 is acted upon via the pressure in curved channel 20. Load-lowering valve bore 98 is open toward consumer channel 33, and so the pressure in consumer channel 33 acts on the region of closing body 102 situated to the left of valve seat 106 as shown in FIG. 3. The axial length of recesses 118 is selected such that the left—as shown in FIG. 3—end face of spring plate 108 is likewise acted upon via the pressure in return channel 32.

Accordingly, load-lowering valve 98 is acted upon in the closing direction by the force of closing spring 52, spring plate 108 of which is pressure-compensated since both end faces are acted upon via the pressure in return channel 32. Furthermore, in the closing direction, the pressure in return channel 32 acts on the differential area of closing body 102, which corresponds to the valve seat surface. In the opening direction, the pressure in curved channel 20 acts on pilot surface 130, and the pressure in consumer channel 33 acts on the surface difference of the valve seat surface and the pilot collar surface (characterized by valve seat diameter and pilot collar diameter, respectively).

As shown in the illustrations in FIGS. 2 and 3, the channel guidance in directional valve element 1 according to the present invention is extremely simple since, via the direct connection of load-lowering valve bore 96, 98 to curved channel 20, no additional channels are required to tap a pilot pressure. In the conventional solutions, pilot surface 130 had to be connected to particular consumer channel 33, 35 via a channel guided around pressure compensator 18, and so housing 58 was much more expensive to manufacture.

If, e.g., the hydrocylinder should now be extended, directional valve 8 is displaced into one of its positions labeled "b", and valve spool 60 is displaced to the right as shown in FIG. 2. As a result, the connection between supply chamber 80 and metering orifice chamber 82 is controlled open via metering orifice control edge 72, and so the pressure medium flows via pressure compensator 18 into curved channel 20. The pressure medium flow is determined via inlet metering orifice 10 (see FIG. 1) which is adjusted using metering orifice control edge 72. At the same time, the pressure medium connection between intermediate chamber 84 and working chamber 88 is controlled open via directional control edge 76, and so the pressure medium enters supply channel 34 and acts in the opening direction on seat sleeve 120 of non-return valve 48 of load-lowering valve 44, and so seat sleeve 120 lifts off of cone 104 of load-lowering valve 44 against the force of weak spring 122, and, with negligible losses, it is made possible for pressure medium to flow into consumer channel 35 and, from there, via working line 38 to bottom cylinder chamber 42 of consumer 2. The hydrocylinder is extended, and the pressure medium that is displaced out of annular space 40 on the same side as the piston rod flows via working line 36 and working port A to load-lowering valve 46. As explained above, this is acted upon by the pressure in curved channel 20 and by the pressure in annular space 40 in the opening direction, and so it opens against the force of closing spring 52 and the pressure in return channel 32, which acts in the closing direction; cone 104 is therefore lifted off of valve seat 106, and the pressure medium flowing out of consumer 2 flows via load-lowering valve 46 into return channel 32 toward working chamber 90 and, finally, via the cross section controlled-open by tank control edge 81, into tank chamber 94 and, from there, toward tank 6.

When directional valve 8 is displaced into one of its positions labeled "a", the load is lowered, and so pressure medium is displaced out of cylinder chamber 42, and is supplied to expanding annular space 40. Uncontrolled lowering is reliably prevented as a result, since, when the load subsides, the pressure in curved channel 20 decreases and load-lowering valve 44 is controlled closed accordingly, in order to build up the aforementioned back-pressure.

In the embodiment shown, working ports A, B of directional valve 8 are connected to tank T when in the home position. Basically, directional valves may also be used, in which, in the home position, working ports A, B are shut off from tank 6, or supply port P and tank port 6 may be connected to one another in the home position. Basically, load-lowering valves 44, 46 may include a control surface that is active in the closing direction, a spring chamber that is ventilated to the atmosphere, or a pressure compensation, in the case of which the pressure in channels 32, 34 do not affect the function of the load-lowering valve.

Disclosed herein is a valve arrangement for supplying pressure medium to a hydraulic consumer, comprising a directional valve which includes an inlet metering orifice which specifies the pressure medium flow, and a directional control part that controls the direction of flow. An individual pressure compensator is assigned to the directional valve. A load-lowering valve which is acted upon in the opening direction via a pilot pressure is provided in a return from the consumer. According to the present invention, this pilot pressure is tapped in a channel between the pressure compensator and the directional control part.

What is claimed is:

1. A valve arrangement for supplying pressure medium to a hydraulic consumer (2), comprising a housing (58) which contains a directional valve (8) that includes an adjustable inlet metering orifice (10, 12), a directional control part (14, 16), and an individual pressure compensator (18) assigned to the inlet metering orifice (10, 12); a load-lowering valve (44, 46) is provided in a return from the consumer (2) and is acted upon in the opening direction via a pilot pressure; connected in parallel therewith is a non-return valve (48, 50) which opens in the direction toward the consumer (2), wherein the pilot pressure is tapped in a channel (20) between the pressure compensator (18) and the directional control part (14, 16).

2. The valve arrangement as recited in claim 1, in which the pressure compensator (18) is connected downstream of the inlet metering orifice (10, 12), and is acted upon by the highest load pressure of all consumers (2) in the direction of reducing the opening cross section, and by the pressure downstream of the inlet metering orifice (10, 12) in the opening direction.

3. The valve arrangement as recited in claim 1, in which the channel is a curved channel (20) between a pressure compensator outlet (C) and intermediate chambers (84, 86), one each of a supply-side and of a return-side directional control part (14, 16) of the directional valve (8).

4. The valve arrangement as recited in claim 1, in which a load-lowering valve (44, 46) is provided in the supply and in the drain, and the same pilot pressure is applied to both.

5. The valve arrangement as recited in claim 4, in which the pilot pressure acts on the end face of a pilot surface (130) of the load-lowering valve (44, 46) which is situated such that its pilot surface (130) points toward the curved channel (20).

6. The valve arrangement as recited in claim 4, in which the two load-lowering valves (44, 46) are situated relative to one another such that they form a "V".

7. The valve arrangement as recited in claim 6, in which the pressure compensator (18) is situated approximately in the central axis between the two load-lowering valves (44, 46).

8. The valve arrangement as recited in claim 1, in which two working ports (A, B) of the directional valve (8) in its home position are connected to a tank (6).

9. The valve arrangement as recited in claim 1, in which the non-return valve (48, 50) and the load-lowering valve (44, 46) are located on a common axis.

10. The valve arrangement as recited in claim 1, in which the valve arrangement is a directional valve element (1) of a mobile control block.

* * * * *